Patented June 13, 1939

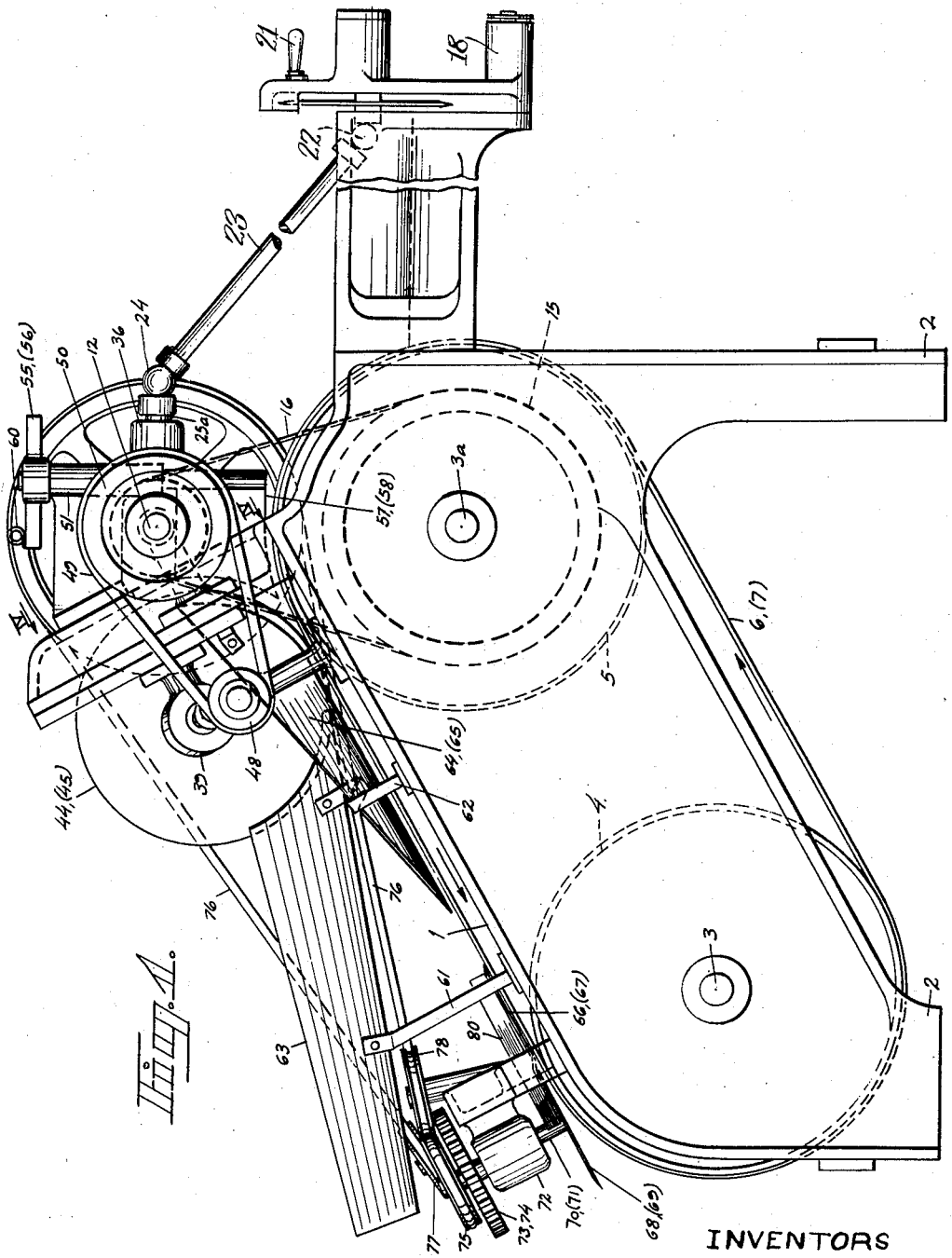

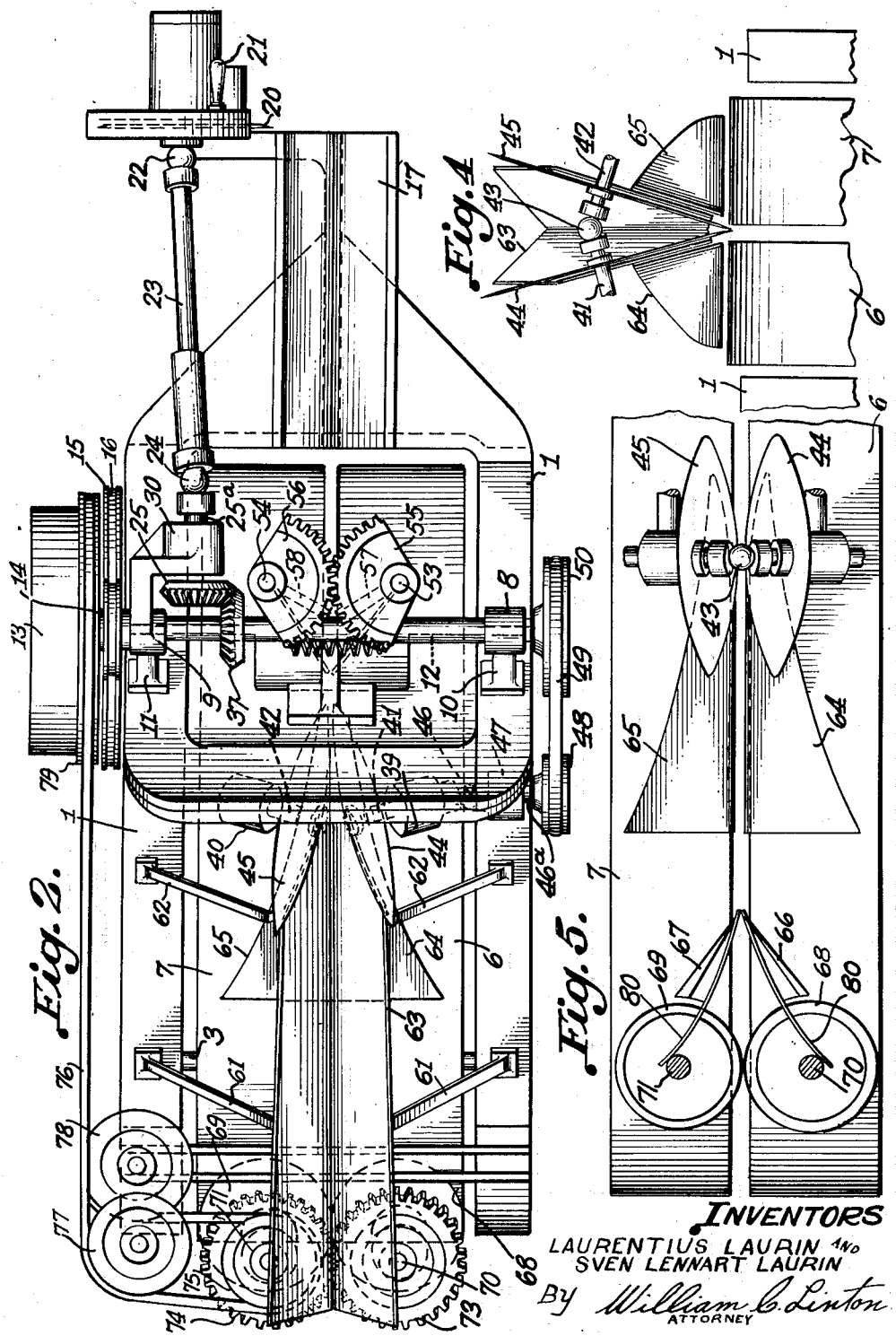

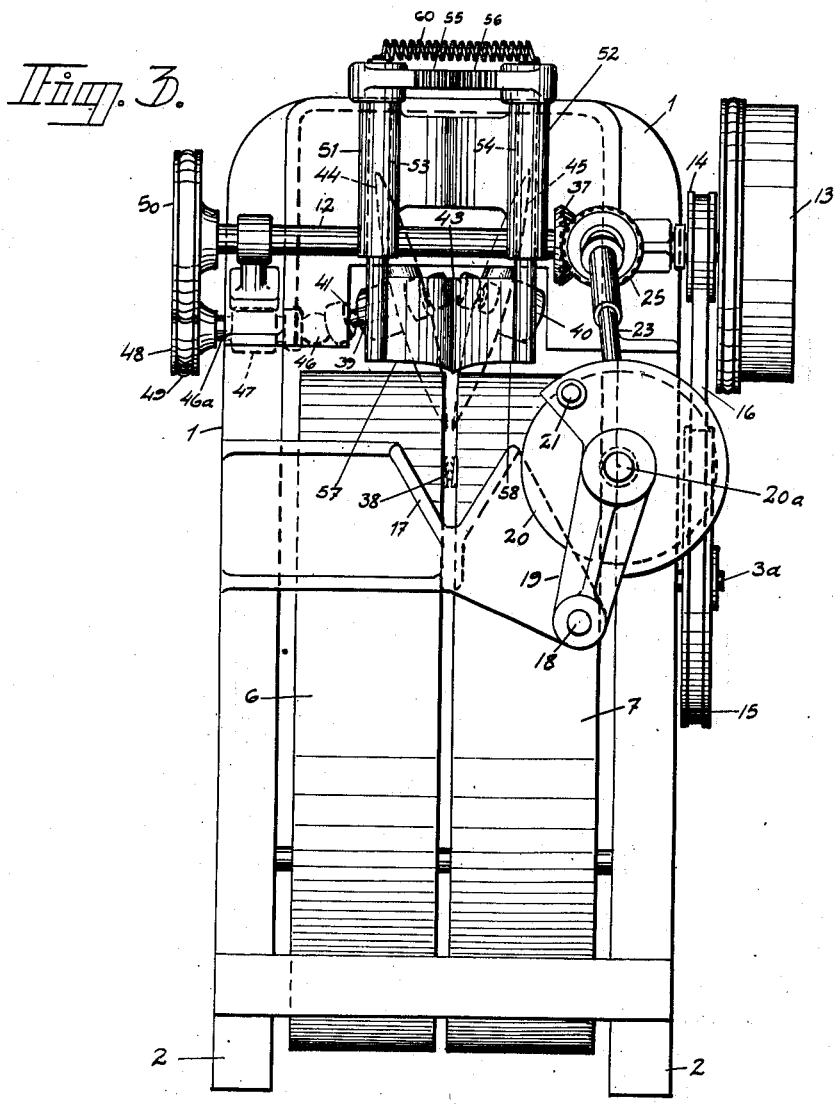

2,162,621

UNITED STATES PATENT OFFICE 2,162,621

FISH BONE AND SKIN REMOVING MACHINE

Laurentius Laurin, Gothenburg, and Sven Lennart Laurin, Bohus, Sweden

Application November 4, 1936, Serial No. 109,146
In Sweden October 14, 1935

3 Claims. (Cl. 17—3)

This invention relates to fish bone and skin removing machines and one object of the invention is to provide a machine of this character which eliminates the use of a plurality of machines formerly required to separate the meat from the entrails, bony portions and skin of a fish.

With this and other objects in view as will appear hereinafter, the invention consists of certain novel combination and arrangement of parts, as will hereinafter be described in detail with reference to the accompanying drawings, in which:—

Figure 1 is a side elevational view of the machine; Figure 2 is a top plan view thereof; Figure 3 is an end view thereof; Figure 4 is a view of certain parts of the machine seen in the direction of the arrows IV, IV in Figure 1, and Figure 5 a diagrammatic top plan view of certain parts of the machine.

In the drawings 1 designates an inclining frame-work supported by four legs 2 and at the lower and upper end of which there are journaled two shafts 3 and 3a disposed parallel to each other and each carrying two drums 4 and 5 of equal size. Over said drums two endless belts 6 and 7 run side by side at a given distance from each other. In bearings 8 and 9 carried by two supports 10 and 11 projecting from the frame there is journaled a main driving shaft 12 which at its one end carries a pulley 13 for a driving belt (not shown in the drawings). At the same end of the shaft 12 there is fixedly mounted another pulley 14 and over said pulley and a pulley 15, fixedly mounted to the one end of the shaft 3a, a belt 16 is caused to run, thus transmitting the rotation of the driving shaft 12 to the drums 4, 5 and the belts 6, 7 which will be imparted a movement in the direction of the arrows in Figure 1.

From the higher end of the frame 1 a trough 17 projects horizontally, and near the free end of said trough, which has a V-shaped cross section, there is, by means of a journal 18, swingably mounted an arm 19 at the free end of which a knife 20 in the shape of a circular disc is rotatorily mounted. By means of a handle 21 the knife 20 may be swung before the outer end of the trough 17 from the position shown in Figure 3 in order to cut off the head of a fish placed in the trough with the head projecting from the end of the trough. To the journal 20a of the knife 20 there is, by means of a universal joint 22, connected the one end of a telescopic shaft 23. The other end of shaft 23 is by means of a universal joint 24 connected to a journal 25a supported by a bearing 36 and carrying a bevel gear wheel 25 on one end thereof which meshes with a bevel gear wheel 37 fixed on the main driving shaft 12 so that when the shaft rotates the knife 20 will be imparted a rotating movement.

The inner end of the trough 17 is situated in front of the space between the belts 6 and 7 and by introducing the tail portion of a fish, resting with its back against the bottom of the trough, between jams 38, which are carried by the belts one in front of the other, the fish will follow the belts.

In bearings 39 and 40 disposed above the drums 5 there are rotatorily mounted two spindles 41 and 42 projecting against each other and forming an obtuse angle with each other. Said spindles 41 and 42 and their adjacent ends each connected to its respective end of a universal joint 43 thereby connecting said spindles whereby one spindle may rotate the other. Each spindle carries a knife 44 and 45 in the shape of a circular disc with sharpened edges, and the inclination of the spindles and the size of the knives are so chosen that the edges of the knives will be situated near each other at a point near the belts 6 and 7 and in front of the space between the belts 6 and 7. The spindle 41 is by means of a universal joint connected to the one end of a shaft 46a journaled in bearings 47 and carrying at the opposite end a pulley 48. Over this runs a belt 49 which also passes over a pulley 50 fixed to the end of the main driving shaft 12 so that, when this shaft is rotating, the two knives 44, 45 will be imparted a rotating movement.

Above each of the drums 5 and in front of each knife 45 and 46, relative to the direction of movement of the belts 6 and 7 there is provided a vertical spindle 53 and 54 rotatorily mounted in bearings 51 and 52. Said spindles carry at their upper end two toothed segments 55 and 56 meshing with each other, and at their lower end two substantially rectangular plates 57 and 58 the lower edge of which is disposed at a little distance above the belts 6 and 7. The plates 57 and 58 project obliquely and rearwardly, taken by the direction of movement of the belts 6 and 7, towards the vertical plane situated in the space between the belts 6 and 7 and their rear edges which are substantially parallel to the spindles are normally kept against each other by means of a spring 60 connecting the toothed segments 55 and 56. It is evident that the two plates 57 and 58, which, against the action of the spring 60, will be swung away from each other by a fish passing with the belts 6 and 7, will guide the fish resting with its back against the belts 6 and 7 in such a manner that its center plane will coincide with the vertical plane through the space between the belts 6 and 7. Consequently, the knives 44, 45 situated immediately behind the plates 57 and 58 will form two cuts or incisions embracing the entrails and backbone of the fish on the belts 6 and 7 passing the knives.

Behind the knives 44 and 45, taken in the direction of movement of the belts 6 and 7, there is provided a trough 63 carried by supports 61 and 62. The front end of this trough 63 embraces the knives 44 and 45 and the trough is adapted to catch and divert the portions cut away from the fish by the knives, that is, the entrails and the backbone.

At the outer side of each knife 44 and 45 there is provided respectively a curved plate 64 and 65, the front end portion of which is disposed near and parallel to the adjacent knife and the rear end portion of which is disposed near and parallel to the adjacent belts 6 and 7. These plates catch with their front edge the side portions of the fish and deflect over the belts the side portions of the fish passing with the belts 6 and 7.

Behind the rear edge of the plates 64 and 65 and at a small distance above the belts 6 and 7 there are provided two knives 66 and 67 obliquely disposed in relation to each other as shown in Figure 5 and adapted to make their way between the skin and the meat of the side portions of the fish flattened out on the belts 6 and 7. Immediately behind said knives 66 and 67 and at a slight distance above the belts 6 and 7 and parallel to these there are provided two rotating knives 68 and 69 in the shape of circular discs which entirely separate the meat portions from the skin. Two curved plates 80 connected to the knives 66 and 67 catch the meat portions thus separated and guide the same to the sides where they drop down in receptacles (not shown).

The circular knives 68 and 69 are fixed to the lower end of two substantially vertical spindles 70 and 71 journaled in two bearings 72 carried by the frame 1, and at the top portion of which there are provided two pinions 73 and 74 meshing with each other. The upper end of the spindle 71 carries a pulley 75, and around said pulley and idlers 77 and 78 carried by the frame 1, a belt 76 runs to a pulley 79 fixed to the main driving shaft 12.

We do not wish to be limited to the particular construction and arrangement described above and shown in the drawings. For example the belts 6 and 7 may be substituted by two drums for conveying the fish.

Having thus described our invention, what we claim as new and desire to secure by Letters Patent is:

1. In a fish bone and skin removing machine, comprising means for conveying the fish with its back resting against said means, a pair of knives mounted in the path of travel of the fish for forming two incisions embracing the entrails and backbone of the fish, deflecting means adapted to flatten out the side portions of the fish over the conveying means after said fish has passed said knives, and further knives for separating the meat of the side portions of the fish thus flattened out from the skin of the fish.

2. In a fish bone and skin removing machine, comprising means for conveying the fish with its back resting against said means, a pair of knives so disposed in the path of travel of the fish as to form two incisions embracing the entrails and backbone of the fish, means for catching and diverting the entrails and backbone, deflecting means adapted to flatten out the side portions of the fish over said conveying means after said fish has passed said knives, and further knives for separating the meat of the side portions of the fish thus flattened out from the skin of the fish.

3. Fish bone and skin removing machine, comprising two conveyor belts running parallel over drums at a given distance from each other, means for holding a fish back down and tail first on said belts, a pair of knives in the shape of circular discs inclining towards each other and towards the conveyor belts and having adjacent edge portions disposed near the space between the conveyor belts so as to form two incisions embracing the entrails and backbone of a fish passing with the conveyor belts, curved plates adapted to deflect the sides of the fish leaving said knives, and further knives mounted at a desired distance above and parallel to the conveyor belts and adapted to separate the meat of the side portions of the fish from the skin of the fish after said fish has passed said curved plates.

LAURENTIUS LAURIN.
SVEN LENNART LAURIN.